United States Patent
Osin et al.

(10) Patent No.: US 8,775,343 B2
(45) Date of Patent: Jul. 8, 2014

(54) METHOD AND DEVICE FOR SYNTHESIS OF NETWORK TRAFFIC

(71) Applicant: Huawei Technologies Co., Ltd, Shenzhen (CN)

(72) Inventors: Andrey Osin, Moscow (RU); Xiuqiang He, Shenzhen (CN); Lujia Pan, Shenzhen (CN); Cheng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/063,715

(22) Filed: Oct. 25, 2013

(65) Prior Publication Data

US 2014/0058985 A1  Feb. 27, 2014

Related U.S. Application Data

(63) Continuation of application No. PCT/CN2011/073451, filed on Apr. 28, 2011.

(51) Int. Cl.
 *G06F 15/18* (2006.01)
 *G06N 3/02* (2006.01)
 *H04L 12/24* (2006.01)

(52) U.S. Cl.
 CPC .............. *G06N 3/02* (2013.01); *H04L 41/147* (2013.01)
 USPC .......................................................... 706/21

(58) Field of Classification Search
None
See application file for complete search history.

(56) References Cited

U.S. PATENT DOCUMENTS

| | | | | |
|---|---|---|---|---|
| 5,450,400 A | * | 9/1995 | Denissen et al. | 370/391 |
| 6,028,847 A | * | 2/2000 | Beanland | 370/252 |
| 7,151,751 B2 | * | 12/2006 | Tagami et al. | 370/252 |
| 7,257,082 B2 | * | 8/2007 | Dugatkin | 370/235 |
| 8,121,031 B2 | * | 2/2012 | Balakrishnan et al. | 370/230.1 |
| 8,254,267 B2 | * | 8/2012 | Srivatsan et al. | 370/241 |
| 2002/0037008 A1 | * | 3/2002 | Tagami et al. | 370/389 |
| 2008/0043748 A1 | * | 2/2008 | Balakrishnan et al. | 370/395.52 |
| 2009/0138420 A1 | | 5/2009 | Swift et al. | |

FOREIGN PATENT DOCUMENTS

| | | |
|---|---|---|
| CN | 1477554 A | 2/2004 |
| CN | 1545245 A | 11/2004 |
| CN | 101610519 A | 12/2009 |
| CN | 101902372 A | 12/2010 |
| EP | 1211641 A1 | 6/2002 |

OTHER PUBLICATIONS

Frost, Victor S. et al.; "Traffic Modeling for Telecommunications Networks"; 1994; IEEE; Communications Magazine Mar. 1994; pp. 70-81.*

(Continued)

*Primary Examiner* — Stanley K Hill
(74) *Attorney, Agent, or Firm* — Slater & Matsil, L.L.P.

(57) ABSTRACT

Embodiments of the present invention provide a method and device for synthesis of network traffic. The method includes extracting a first real traffic composition parameter sequence and a second real traffic composition parameter sequence from real traffic. A first synthetic traffic composition parameter sequence is generated. Relational coefficients between first traffic composition parameters and second traffic composition parameters are obtained. A second synthetic traffic composition parameter sequence is generated and synthetic traffic is generated according to the first synthetic traffic composition parameter sequence and the second synthetic traffic composition parameter sequence.

20 Claims, 4 Drawing Sheets

(56) References Cited

OTHER PUBLICATIONS

Riedi, Rudolf H. et al.; "A Multifractal Wavelet Model with Application to Network Traffic"; 1999; IEEE; Transactions on Information Theory, vol. 45, No. 3; pp. 992-1018.*

Ma, Sheng et al.; "Modeling Heterogeneous Network Traffic in Wavelet Domain"; 2001; IEEE; Transactions on Networking, vol. 9, No. 5; pp. 634-649.*

Gabor, Simon et al.; "The analogies of highway and computer network traffic"; 2002; Elsevier Science; Physica A 307; pp. 516-526.*

Jiang, Xiaomo et al.; "Dynamic Wavelet Neural Network Model for Traffic Flow Forecasting"; 2005; ASCE; Journal of Transportation Engineering; pp. 771-779.*

International Search Report received in Application No. PCT/CN2011/073451, mailed Feb. 23, 2012, 4 pages.

Chinese Search Report received in Application No. 2011800003076 mailed Oct. 23, 2012, 2 pages.

International Search Report and Written Opinion received in Application No. PCT/CN2011/073451 mailed Feb. 23, 2012, 11 pages.

Maguire, et al., "Predicting Chaotic Time Series Using a Fuzzy Neural Network," Information Sciences, vol. 112, Issues 1-4, Dec. 1998, 8 pages.

Riedi, R. et al., "A Multifractal Wavelet Model with Application to Network Traffic," IEEE Transactions on Information Theory, vol. 45, No. 3, Apr. 1999, 28 pages.

* cited by examiner

Input layer  Hidden layer  Output layer

Traffic volume sequence    Packet quantity sequence

METHOD AND DEVICE FOR SYNTHESIS OF NETWORK TRAFFIC

CROSS-REFERENCE TO RELATED APPLICATIONS

This application is a continuation of International Application No. PCT/CN2011/0133451, filed on Apr. 28, 2011, which are hereby incorporated by reference in their entireties.

TECHNICAL FIELD

Embodiments of the present invention relate to communications technologies and, in particular embodiment, to a method and device for synthesis of network traffic.

BACKGROUND

With the rapid development of the mobile telecommunications industry, especially the explosive growth of the 3G network, the increase of network traffic is far beyond the expectation of operators. Meanwhile, the number of 3G mobile users is still increasing rapidly, and the rapid increase of network traffic is a huge challenge to operator networks. Therefore, in-depth analysis of current network traffic characteristics of the operator networks is of great importance to network optimization of the operators and so on. Network simulation is a simulation technology that simulates network traffic transmission by establishing abstract models of network traffic and network links, thereby obtaining network performance data. In the network simulation, network traffic serving as an input parameter may be real traffic collected from a current network or synthetic network traffic (briefly referred to as synthetic traffic) generated according to some characteristics of the real traffic. The synthetic traffic satisfies some characteristics of the real traffic, but is not totally the same as the real traffic; it may be used in the network simulation to simulate characteristics that the real traffic cannot satisfy, for example, may simulate the network traffic after the number of users is increased, and therefore may be used to simulate the endurance of an existing operator network to future network traffic, so as to provide a basis for upgrading or updating operator network equipment. Therefore, it is an important research subject in the network simulation to generate synthetic traffic better satisfying the characteristics of the current network.

In the prior art, a method for synthesis of network traffic is to extract a packet quantity sequence in unit time and a traffic volume sequence in unit time respectively according to data collected from the current network, and then generate synthetic packet quantity sequence and traffic volume sequence in unit time respectively by using a proper algorithm, where a multi-fractal wavelet model algorithm, a Markov-modulated Poisson process algorithm or the like may specifically be adopted.

However, in the prior art, correlation between two constituents of network traffic is not considered when synthetic traffic is generated, and network simulation by using the synthetic traffic cannot realistically simulate the effect of real traffic on the network, thereby reducing the accuracy of a simulation result.

SUMMARY OF THE INVENTION

Embodiments of the present invention provide a method and device for synthesis of network traffic, which consider correlation between two constituents of network traffic, so that synthetic traffic better matches real traffic, and the effect of the real traffic on the network can be simulated more realistically, thereby providing a more accurate simulation result.

An embodiment of the present invention provides a method for synthesis of network traffic. A first real traffic composition parameter sequence and a second real traffic composition parameter sequence are extracted from a real traffic. A first synthetic traffic composition parameter sequence is generated according to the first real traffic composition parameter sequence. Relational coefficients between first traffic composition parameters and second traffic composition parameters are obtained by performing correlation learning on the first real traffic composition parameter sequence and the second real traffic composition parameter sequence. A second synthetic traffic composition parameter sequence is generated according to the first synthetic traffic composition parameter sequence and the relational coefficients and synthetic traffic is generated according to the first synthetic traffic composition parameter sequence and the second synthetic traffic composition parameter sequence.

An embodiment of the present invention provides a device for synthesis of network traffic. An extraction module is configured to extract, from real traffic, a first real traffic composition parameter sequence and a second real traffic composition parameter sequence. A first generation module is configured to generate a first synthetic traffic composition parameter sequence according to the first real traffic composition parameter sequence. An obtaining module is configured to obtain relational coefficients between first traffic composition parameters and second traffic composition parameters by performing autocorrelation learning on the first real traffic composition parameter sequence and the second real traffic composition parameter sequence. A second generation module is configured to generate a second synthetic traffic composition parameter sequence according to the first synthetic traffic composition parameter sequence and the relational coefficients. A synthesis module is configured to generate synthetic traffic according to the first synthetic traffic composition parameter sequence and the second synthetic traffic composition parameter sequence.

In the method and device for synthesis of network traffic provided in the embodiments of the present invention, the relational coefficients between the first traffic composition parameters and the second traffic composition parameters are obtained by performing autocorrelation learning on the first real traffic composition parameter sequence and the second real traffic composition parameter sequence that are extracted from the real traffic, and then the second synthetic traffic composition parameter sequence is obtained according to the generated first synthetic traffic composition parameter sequence and the relational coefficient, thereby generating synthetic traffic. In the present invention, the correlation between two constituents of network traffic is considered, so that the synthetic traffic matches the real traffic better, and the effect of the real traffic on the network can be simulated more realistically, thereby providing a more accurate simulation result.

BRIEF DESCRIPTION OF THE DRAWINGS

To describe the technical solutions in embodiments of the present invention or in the prior art more clearly, the following briefly introduces the accompanying drawings needed for describing the embodiments. Apparently, the accompanying drawings in the following description show merely some embodiments of the present invention, and persons of ordi

DETAILED DESCRIPTION OF ILLUSTRATIVE EMBODIMENTS

To make objectives, technical solutions, and advantages of embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
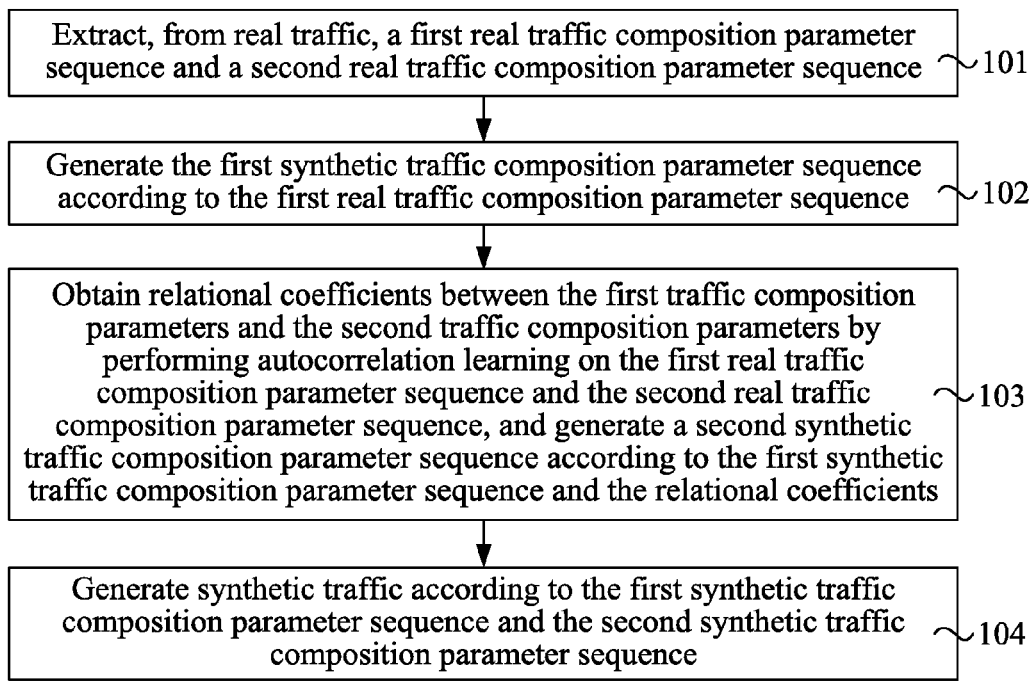
- FIG. 1 is a flow chart of a first embodiment of a method for synthesis of network traffic according to the present invention.

FIG. 1 is a flow chart of a first embodiment of a method for synthesis of network traffic according to the present invention. As shown in FIG. 1, this embodiment provides a method for synthesis of network traffic, which may specifically include following steps.

Step 101: Extract, from real traffic, a first real traffic composition parameter sequence and a second real traffic composition parameter sequence.

In this embodiment, the real traffic is used to synthesize synthetic traffic, and after the real traffic is obtained, the first real traffic composition parameter sequence and the second real traffic composition parameter sequence are extracted from the real traffic. Because basic constituents of the network traffic may include various forms under different network simulation accuracy requirements, here they are collectively referred to as a first traffic composition parameter and a second traffic composition parameter, and their corresponding sequences are a first traffic composition parameter sequence and a second traffic composition parameter sequence respectively. In order to distinguish the real traffic and the synthetic traffic, the basic constituents are named respectively. For the real traffic, here they may be referred to as the first real traffic composition parameter sequence and the second real traffic composition parameter sequence respectively. For the synthetic traffic, here they may be referred to as a first synthetic traffic composition parameter sequence and a second synthetic traffic composition parameter sequence respectively.

Specifically, the first traffic composition parameter in this embodiment may be a packet quantity in unit time, and correspondingly the second traffic composition parameter may be a traffic volume in unit time. Alternatively, the first traffic composition parameter may be the traffic volume in unit time, and correspondingly the second traffic composition parameter may be the packet quantity in unit time. Alternatively, the first traffic composition parameter may be a packet interval, and correspondingly the second traffic composition parameter may be a packet size. Alternatively, the first traffic composition parameter may be the packet size, and correspondingly the second traffic composition parameter may be the packet interval.

Step 102: Generate the first synthetic traffic composition parameter sequence according to the first real traffic composition parameter sequence.

After the first real traffic composition parameter sequence and the second real traffic composition parameter sequence are extracted from the real traffic, in this step, the first synthetic traffic composition parameter sequence is generated according to the first real traffic composition parameter sequence firstly. Specifically, a multi-fractal wavelet model algorithm may be adopted to generate a time sequence satisfying a multi-fractal characteristic, or a Markov-modulated Poisson process algorithm may be adopted to generate a time sequence satisfying a self-similarity characteristic, or a Poisson process may be adopted to generate a time sequence satisfying a Poisson distribution.

Step 103: Obtain relational coefficients between the first traffic composition parameters and the second traffic composition parameters by performing autocorrelation learning on the first real traffic composition parameter sequence and the second real traffic composition parameter sequence, and generate a second synthetic traffic composition parameter sequence according to the first synthetic traffic composition parameter sequence and the relational coefficients.

After the two basic constituents in the real traffic are obtained, that is, after the first real traffic composition parameter sequence and the second real traffic composition parameter sequence are obtained, autocorrelation learning is performed on the first real traffic composition parameter sequence and the second real traffic composition parameter sequence. Through an autocorrelation learning process, the relational coefficients between the first traffic composition parameters and the second traffic composition parameters in the real traffic is obtained, that is, correlation between the first traffic composition parameters and the second traffic composition parameters is obtained. A relational equation between the first traffic composition parameters and the second traffic composition parameters may specifically be established in the autocorrelation learning process, and then a corresponding relational coefficient may be learned. Afterwards, the second synthetic traffic composition parameter sequence is generated according to the first synthetic traffic composition parameter sequence generated in step 102 and the relational coefficients between the two parameters that are obtained in the foregoing process. Specifically, each value in the first synthetic traffic composition parameter sequence and the relational coefficients may be introduced into the relational equation, so as to obtain each value in the second synthetic traffic composition parameter sequence.

Step 104: Generate synthetic traffic according to the first synthetic traffic composition parameter sequence and the second synthetic traffic composition parameter sequence.

After the first synthetic traffic composition parameter sequence and the second synthetic traffic composition parameter sequence are obtained, the two may be synthesized into the synthetic traffic. In the two constituents in the synthetic traffic, the second synthetic traffic composition parameter sequence already considers its correlation with the first synthetic traffic composition parameter sequence.

In the method for synthesis of network traffic provided in this embodiment, the relational coefficients between the first traffic composition parameters and the second traffic composition parameters are obtained by performing autocorrelation learning on the first real traffic composition parameter sequence and the second real traffic composition parameter sequence that are extracted from the real traffic, and then the second synthetic traffic composition parameter sequence is obtained according to the generated first synthetic traffic composition parameter sequence and the relational coefficients, thereby generating synthetic traffic. In this embodiment, the correlation between two constituents of network traffic is considered, so that the synthetic traffic matches the real traffic better, and the effect of the real traffic on the network can be simulated more realistically, thereby providing a more accurate simulation result.

Figure 2:
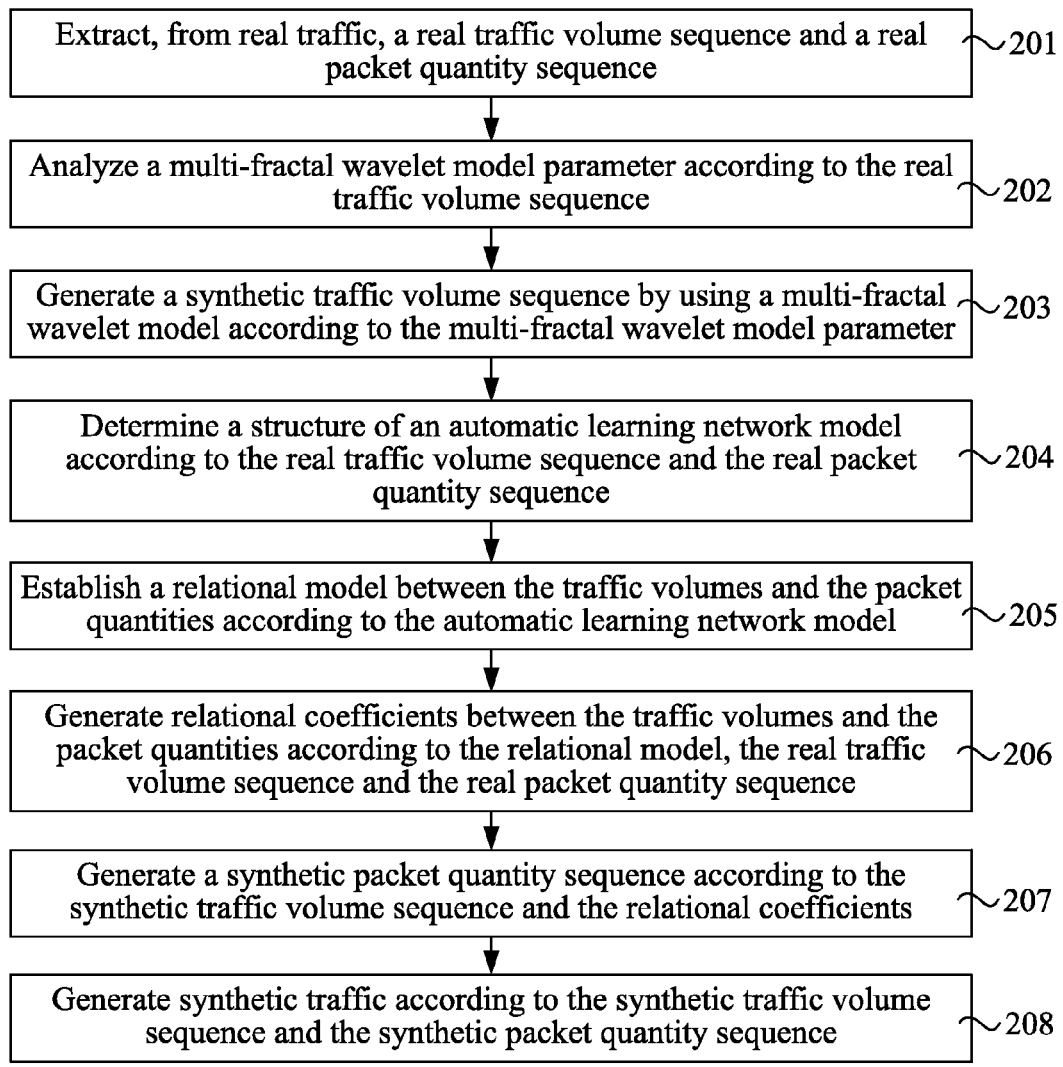
FIG. 2 is a flow chart of a second embodiment of the method for synthesis of network traffic according to the present invention.

FIG. 2 is a flow chart of a second embodiment of the method for synthesis of network traffic according to the present invention. As shown in FIG. 2, this embodiment provides a method for synthesis of network traffic. This embodiment is specifically illustrated through an example where the first traffic composition parameter is the traffic volume in unit time (hereinafter briefly referred to as traffic volume), and the second traffic composition parameter is the packet quantity in unit time (hereinafter briefly referred to as packet quantity). The method for synthesis of network traffic provided in this embodiment may specifically include following steps.

Step 201: Extract, from real traffic, a real traffic volume sequence and a real packet quantity sequence. This step may be similar to the foregoing step 101, so the details are not described here again.

Step 202: Analyze a multi-fractal wavelet model parameter according to the real traffic volume sequence.

In this embodiment, the technical solution is specifically illustrated in detail through an example of generating a synthetic traffic volume sequence by using the multi-fractal wavelet model algorithm, where multi-fractal model parameter analysis is performed according to the extracted real traffic volume sequence firstly, so as to obtain the multi-fractal wavelet model parameter. For a specific analysis method, reference may be made to a method described in the document: Rudolf H. Riedi, Matthew S. Crouse, Vinay J. Ribeiro, Richard G. Baraniuk: A Multifractal Wavelet Model with Application to Network Traffic. IEEE Transaction on Information Theory 45(3): 992-1018 (1999), which is not described in detail here again.

Step 203: Generate a synthetic traffic volume sequence by using a multi-fractal wavelet model according to the multi-fractal wavelet model parameter.

After the multi-fractal wavelet model parameter is obtained through analysis, the synthetic traffic volume sequence is generated by using the multi-fractal wavelet model, and a specific generation method may also be similar to the method in the document shown in the foregoing step 202. It should be noted that, the method for generating the synthetic traffic volume sequence in this embodiment is not limited to the multi-fractal wavelet model, and persons skilled in the art may adopt other similar methods for implementation, which is not be described in detail here again.

Step 204: Determine a structure of an automatic learning network model according to the real traffic volume sequence and the real packet quantity sequence.

The relational coefficients between traffic volumes and packet quantities are obtained in this embodiment through an example where an artificial neural network algorithm is used. Persons skilled in the art may also adopt other existing relationship learning algorithms. For example, a fuzzy artificial neural network algorithm and a regression model algorithm could be used even though they are not described one by one here.

An autocorrelation learning process is illustrated in the following by taking an artificial neural network as an example. When automatic learning is performed on autocorrelation between the traffic volumes and the packet quantities, the structure of the automatic learning network model is determined according to the real traffic volume sequence and the real packet quantity sequence extracted in step 201. That is, values of parameters m and n in a structure of m*n*1 of the network model are determined. The parameter m is the number of neurons in an input layer, and n is the number of neurons in a hidden layer, which specifically may be determined according to the number of elements in the real traffic volume sequence and the real packet quantity sequence. When the number of the elements is large, the values of m and n may be set high.

Specifically, the network model may be formed by the input layer, the hidden layer and an output layer that are connected in turn, where each neuron in the hidden layer is connected to all neurons in the input layer, each neuron in the output layer is connected to all neurons in the hidden layer, and the input value of each neuron is a sum of products of all the output values input into the neuron and weights of corresponding connections. Each neuron of the input layer corresponds to a predictor variable, each neuron of the output layer corresponds to a target variable, and the number of hidden layers and the number of neurons in each layer determine the complexity of the neural network.

Figure 3:
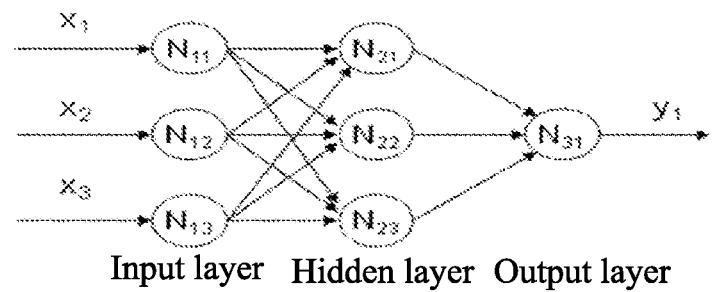
FIG. 3 is a schematic structural diagram of an artificial neural network in the second embodiment of the method for synthesis of network traffic according to the present invention.

FIG. 3 is a schematic structural diagram of an artificial neural network in the second embodiment of the method for synthesis of network traffic according to the present invention. As shown in FIG. 3, in this embodiment, it is assumed that the input layer includes 3 neurons, that is, the value of the parameter m is 3, the hidden layer include 3 neurons, that is, the value of the parameter n is 3, and the output layer includes 1 neuron; that is, the structure of the network model is 3*3*1. In this embodiment, each neuron in each layer is equivalent to a function, and includes an input value and an output value, where the input value is a sum of products of all the output values input into the neuron and the weights of the corresponding connections. For example, the input value of neuron $N_{21}$ is a sum of a product of neuron $N_{11}$ and a weight of connection $N_{11}$-$N_{21}$, a product of neuron $N_{12}$ and a weight of connection $N_{12}$-$N_{21}$, and a product of neuron $N_{13}$ and a weight of connection $N_{13}$-$N_{21}$.

Step 205: Establish a relational model between the traffic volumes and the packet quantities according to the automatic learning network model.

After the structure of the automatic learning network model is determined, the relational model between the traffic volumes and the packet quantities is established according to the automatic learning network model. In the artificial neural network shown in FIG. 3, the traffic volume serves as an input of the network model, and the packet quantity serves as an output of the network model. Specifically, the traffic volumes serve as inputs of the neurons in the input layer, and the packet quantities serve as outputs of the neurons in the output layer. Because a connection relationship exists among the input layer, the hidden layer, and the output layer, and the input value of each neuron in each layer is equal to a sum of products of the output value of each neuron in a former layer and the weights of the corresponding connections, the relational model between the input and the output of the network model may be obtained, that is, the relational model between the traffic volumes and the packet quantities may be established, which may be deduced with reference to the foregoing process of calculating the input value of neuron $N_{21}$ and is not described here again.

Step 206: Generate relational coefficients between the traffic volumes and the packet quantities according to the relational model, the real traffic volume sequence and the real packet quantity sequence.

Figure 4:
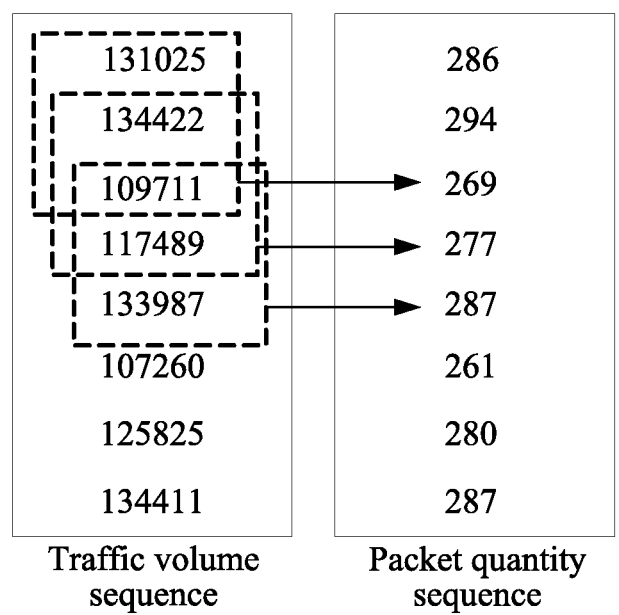
FIG. 4 is a schematic diagram of a relationship between traffic volumes and packet quantities in the second embodiment of the method for synthesis of network traffic according to the present invention.

After the relational model between the traffic volumes and the packet quantities is established, the relational coefficients between the traffic volumes and the packet quantities may be generated according to the relational model, the extracted real traffic volume sequence and the extracted real packet quantity sequence. Here, the relational coefficient may specifically be the weight of each connection in the network model, and specifically, each value in the real traffic volume sequence and the real packet quantity sequence may be introduced in the relational model to obtain the weight of each connection. In this embodiment, in order to establish the relationship between the traffic volumes and the packet quantities, the artificial neural network model may be marked as 3*3*1 (traffic volume→packet quantity). FIG. 4 is a schematic diagram of a relationship between traffic volumes and packet quantities in Embodiment 2 of the method for synthesis of network traffic according to the present invention. As shown in FIG. 4, in the construction process of the neural network, by inputting three consecutive traffic volume sequences into the established relational model in turn, the output packet quantities may be compared with the real packet quantities, and then the weight of each connection is adjusted according to a comparison result, until an error between the output packet quantity sequence and the real packet quantity sequence is smaller than a specified value. In this way, the construction of the neural network in this embodiment is completed.

Step 207: Generate a synthetic packet quantity sequence according to the synthetic traffic volume sequence and the relational coefficients.

After the synthetic traffic volume sequence and the relational coefficients between the traffic volumes and the packet quantities are obtained, that is, the weight of each connection, the synthetic packet quantity sequence is generated according to the synthetic traffic volume sequence and the relational coefficients. Specifically, the synthetic traffic volume sequence may be introduced into the relational model including the weight, so as to generate a corresponding synthetic packet quantity sequence by calculation. Similar to FIG. 5, in the process of generating the synthetic packet quantity sequence, specifically three consecutive synthetic traffic volume sequences may be used as the input, so as to generate a synthetic packet quantity sequence. It may be seen that, the generated synthetic packet quantity sequence is correlated to the synthetic traffic volume sequence, and is not independent of the synthetic traffic volume sequence as in the prior art.

Step 208: Generate synthetic traffic according to the synthetic traffic volume sequence and the synthetic packet quantity sequence.

After the synthetic traffic volume sequence and the synthetic packet quantity sequence are generated in turn in the foregoing steps, the synthetic traffic volume sequence and the synthetic packet quantity sequence are synthesized, so as to obtain final synthetic traffic.

Afterwards, after the synthetic traffic is generated, the effect of the synthetic traffic on the network may be estimated through a network simulator (NS2). Link parameters may be set as follows: bandwidth is 2 Mbps, a queue model is a random early detection (RED), and a link queue size is 5. Table 1 below shows an exemplary comparison of effects of the synthetic traffic generated in this embodiment and the synthetic traffic generated in the prior art on the network in the same network simulation condition, where network delay is taken as an example for illustration.

TABLE 1

EXEMPLARY COMPARISON OF EFFECTS OF THE SYNTHETIC TRAFFIC GENERATED IN THIS EMBODIMENT AND THE PRIOR ART ON THE NETWORK

| | Network delay (μs) | | | | |
|---|---|---|---|---|---|
| | Minimum | Maximum | Mean | Variance | Artificial neural network design |
| Real traffic | 13 | 29 | 20.00 | 8.17 | |
| Existing solution | 7 | 50 | 19.46 | 57.30 | |
| New solution 1 | 15 | 39 | 25.70 | 9.77 | 2 × 3 × 1 (traffic volume → packet quantity) |
| New solution 2 | 15 | 21 | 19.34 | 0.60 | 2 × 3 × 1 (packet quantity → traffic volume) |
| New solution 3 | 17 | 25 | 19.51 | 1.20 | 3 × 3 × 1 (packet quantity → traffic volume) |
| New solution 4 | 12 | 27 | 19.60 | 6.61 | 10 × 3 × 1 (packet quantity → traffic volume) |
| New solution 5 | 12 | 26 | 19.50 | 6.30 | 6 × 3 × 1 (traffic volume → packet quantity) |
| New solution 6 | 12 | 28 | 19.55 | 6.66 | 10 × 10 × 1 (traffic volume → packet quantity) |
| New solution 7 | 12 | 27 | 19.46 | 6.58 | 3 × 1 × 1 (traffic volume → packet quantity) |

In Table 1, when the solution in the prior art is adopted to perform synthesis of synthetic traffic, it is reflected on the network delay. Except that the mean is close to that of the real traffic, the minimum, the maximum, and the variance of the network delay are greatly different from those of the real traffic. The solution design of this embodiment is used to implement 7 structures of the neural network, and the same data source is used to generate the synthetic traffic. The result of the simulation experiment shows that, when the method for synthesis of network traffic provided in this embodiment is adopted, indexes such as the minimum, the maximum, the mean, and the variance of the network delay are close to those of the real traffic. Results of new solution 4 and new solution 6 are closest to the real traffic, which also indicates that, with the increase of the complexity of the neural network, the neural network is capable of obtaining the relationship between the traffic volumes and the packet quantities in the real traffic more accurately, and the generated synthetic traffic is more accurate.

It may be seen that, by adopting the method for synthesis of network traffic provided in this embodiment to generate the synthetic traffic, the synthetic traffic can match the real traffic better. Therefore, when the generated synthetic traffic is used to perform network simulation, the real condition of the network may be simulated more accurately, thereby providing a more accurate simulation result.

The advantages of this embodiment may be summarized as follows. First, this embodiment may integrate an existing synthetic traffic time sequence generating algorithm, for example, multi-fractal wavelet model and Markov-modulated Poisson process. Different synthetic traffic time sequences reflect different characteristics of the real traffic concerned. Therefore, the present invention is applicable to extensive research of real traffic characteristics, so as to generate real traffic satisfying the characteristics according to the real traffic characteristics concerned, and carry out in-depth research through network simulation.

Secondly, in this embodiment, the network simulation serves as a basis for evaluating the accuracy of synthetic traffic. Through the experimental result shown in Table 1, it may be seen that in this embodiment, the synthetic traffic matches the real traffic better in terms of the effect on the network. Meanwhile, because the existing synthetic traffic generating algorithm may be used in this embodiment, if the selected synthetic traffic time sequence generating algorithm can accurately simulate some characteristics of the real traffic, for example, the multi-fractal wavelet model may match the self-similarity and multi-fractal characteristics of the real traffic better, the real traffic may be better matched in terms of statistical characteristic and the effect on the network in this embodiment.

Thirdly, in this embodiment, through an automatic learning algorithm in the existing artificial intelligence field, an internal relationship, especially correlation in time, between two constituents of the synthetic traffic is extracted. The algorithm is applied to a frame proposed in this embodiment, so as to generate more accurate synthetic traffic. Meanwhile, a proper algorithm, such as neural network, fuzzy neural network, linear fitting and like technologies may also be selected in the automatic learning process, which provides good extensibility.

Fourthly, the synthetic traffic generated in this embodiment may be applied to network simulation, and may also be applied to network traffic prediction (research on network traffic under different scales of users), abnormal traffic detection, verification of existing network scheduling or management algorithms and so on.

Persons of ordinary skill in the art may understand that all or part of the steps of the methods in the embodiments may be implemented by a program instructing relevant hardware. The program may be stored in a computer readable storage medium. When the program is run, the foregoing steps of the methods in the embodiments are performed. The storage medium may be any medium capable of storing program codes, such as ROM, RAM, magnetic disk, or optical disk.

Figure 5:
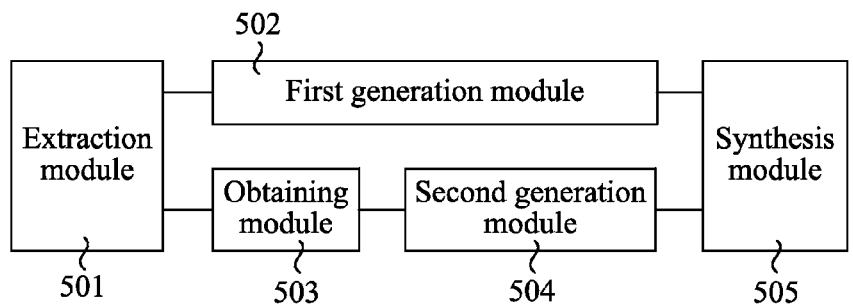
FIG. 5 is a structural diagram of a device for synthesis of network traffic according to the present invention.

FIG. 5 is a structural diagram of Embodiment 1 of a device for synthesis of network traffic according to the present invention. As shown in FIG. 5, this embodiment provides a device for synthesis of network traffic, which may specifically perform the steps in Embodiment 1 of the foregoing method, which is not described in detail here again. The device for synthesis of network traffic provided in this embodiment may specifically include an extraction module 501, a first generation module 502, an obtaining module 503, a second generation module 504, and a synthesis module 505. The extraction module 501 is configured to extract, from real traffic, a first real traffic composition parameter sequence and a second real traffic composition parameter sequence.

The first generation module 502 is configured to generate a first synthetic traffic composition parameter sequence according to the first real traffic composition parameter sequence. The obtaining module 503 is configured to obtain relational coefficients between first traffic composition parameters and second traffic composition parameters by performing autocorrelation learning on the first real traffic composition parameter sequence and the second real traffic composition parameter sequence. The second generation module 504 is configured to generate a second synthetic traffic composition parameter sequence according to the first synthetic traffic composition parameter sequence and the relational coefficients. The synthesis module 505 is configured to generate synthetic traffic according to the first synthetic traffic composition parameter sequence and the second synthetic traffic composition parameter sequence.

Figure 6:
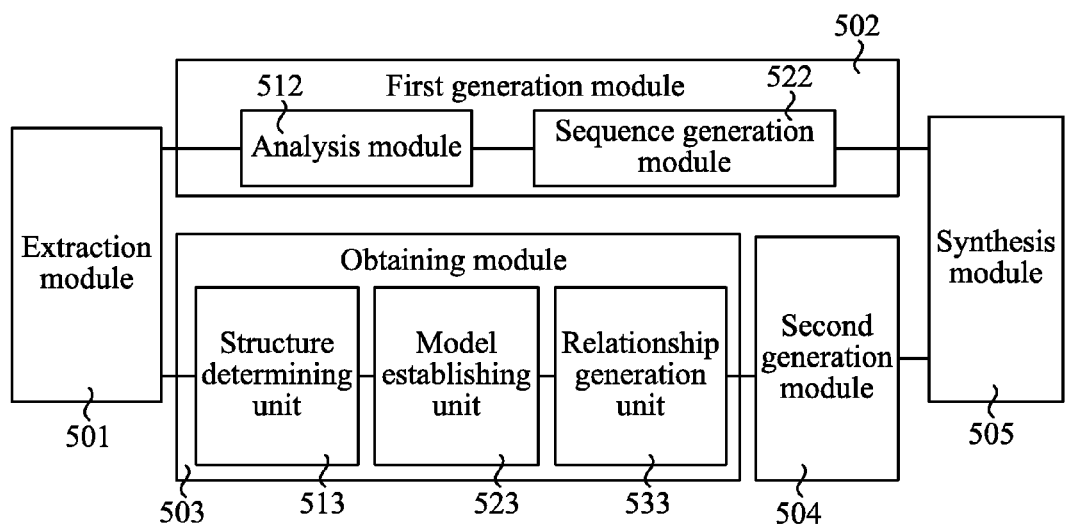
FIG. 6 is a structural diagram of the device for synthesis of network traffic according to the present invention.

FIG. 6 is a structural diagram of Embodiment 2 of the device for synthesis of network traffic according to the present invention. As shown in FIG. 6, this embodiment provides the device for synthesis of network traffic, which may specifically perform the steps in Embodiment 2 of the foregoing method, which is not described in detail here again. For the device for synthesis of network traffic provided in this embodiment, on the basis of that shown in FIG. 5, the obtaining module 503 may specifically include a structure determining unit 513, a model establishing unit 523, and a relationship generation unit 533. The structure determining unit 513 is configured to determine a structure of an automatic learning network model according to the first real traffic composition parameter sequence and the second real traffic composition parameter sequence.

The network model is formed by an input layer, a hidden layer and an output layer that are connected in turn. Each neuron in the hidden layer is connected to all neurons in the input layer, each neuron in the output layer is connected to all neurons in the hidden layer, and the input value of each neuron is a sum of products of all output values input into the neuron and weights of corresponding connections. The model establishing unit 523 is configured to establish a relational model between the first traffic composition parameters and the second traffic composition parameters according to the automatic learning network model, where the first traffic composition parameters serve as inputs of the neurons in the input layer, and the second traffic composition parameters serve as outputs of the neurons in the output layer.

The relationship generation unit 533 is configured to generate the relational coefficients between the first traffic composition parameters and the second traffic composition parameters according to the relational model, the first real traffic composition parameter sequence and the second real traffic composition parameter sequence, where the relational coefficient is the weight of each connection in the network model.

Specifically, the first generation module 502 may specifically include an analysis unit 512 and a sequence generation unit 522. The analysis unit 512 is configured to analyze a multi-fractal wavelet model parameter according to the first real traffic composition parameter sequence. The sequence generation unit 522 is configured to generate, according to the multi-fractal wavelet model parameter, the first synthetic traffic composition parameter sequence by using a multi-fractal wavelet model.

Specifically, in this embodiment, the first traffic composition parameter may be a packet quantity in unit time, and the second traffic composition parameter may be a traffic volume in unit time. Alternatively, the first traffic composition parameter may be the traffic volume in unit time, and the second traffic composition parameter may be the packet quantity in unit time. Alternatively, the first traffic composition parameter may be a packet interval, and the second traffic composition parameter may be a packet size. Alternatively, the first traffic composition parameter may be the packet size, and the second traffic composition parameter may be the packet interval.

Specifically, the automatic learning network model in this embodiment includes an artificial neural network model, a fuzzy artificial neural network model and a regression model.

In the device for synthesis of network traffic provided in this embodiment, the relational coefficients between the first traffic composition parameters and the second traffic composition parameters are obtained by performing autocorrelation learning on the first real traffic composition parameter sequence and the second real traffic composition parameter sequence that are extracted from the real traffic, and then the second synthetic traffic composition parameter sequence is obtained according to the generated first synthetic traffic composition parameter sequence and the relational coefficients, thereby synthesizing into synthetic traffic. In this embodiment, the correlation between two constituents of network traffic is considered, so that the synthetic traffic matches the real traffic better, and the effect of the real traffic on the network can be simulated more realistically, thereby providing a more accurate simulation result.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for synthesis of network traffic, the method comprising:
   extracting, from real traffic, a first real traffic composition parameter sequence and a second real traffic composition parameter sequence;
   generating a first synthetic traffic composition parameter sequence according to the first real traffic composition parameter sequence;
   obtaining relational coefficients between first traffic composition parameters and second traffic composition parameters by performing autocorrelation learning on the first real traffic composition parameter sequence and the second real traffic composition parameter sequence;
   generating a second synthetic traffic composition parameter sequence according to the first synthetic traffic composition parameter sequence and the relational coefficients; and
   generating synthetic traffic according to the first synthetic traffic composition parameter sequence and the second synthetic traffic composition parameter sequence.

2. The method according to claim 1, wherein obtaining the relational coefficients between first traffic composition parameters and second traffic composition parameters comprises:
   determining a structure of an automatic learning network model according to the first real traffic composition parameter sequence and the second real traffic composition parameter sequence;
   establishing a relational model between the first traffic composition parameters and the second traffic composition parameters according to the automatic learning network model; and
   generating the relational coefficients between the first traffic composition parameters and the second traffic composition parameters according to the relational model, the first real traffic composition parameter sequence, and the second real traffic composition parameter sequence.

3. The method according to claim 2, wherein generating the first synthetic traffic composition parameter sequence according to the first real traffic composition parameter sequence comprises:
   analyzing a multi-fractal wavelet model parameter according to the first real traffic composition sequence; and
   generating the first synthetic traffic composition parameter sequence by using a multi-fractal wavelet model according to the multi-fractal wavelet model parameter.

4. The method according to claim 2, wherein the first traffic composition parameter is a packet quantity in unit time and the second traffic composition parameter is a traffic volume in unit time.

5. The method according to claim 2, wherein the first traffic composition parameter is a traffic volume in unit time and the second traffic composition parameter is a packet quantity in unit time.

6. The method according to claim 2, wherein the first traffic composition parameter is a packet interval and the second traffic composition parameter is a packet size.

7. The method according to claim 2, wherein first traffic composition parameter is a packet size and the second traffic composition parameter is a packet interval.

8. The method according to claim 2, wherein the automatic learning network model comprises an artificial neural network model, a fuzzy artificial neural network model, or a regression model.

9. The method according to claim 2, wherein the automatic learning network model comprises an artificial neural network model.

10. The method according to claim 2, wherein the automatic learning network model comprises a fuzzy artificial neural network model.

11. The method according to claim 2, wherein the automatic learning network model comprises a regression model.

12. A device for synthesis of network traffic, the device comprising:
   programmable hardware coupled to a computer readable storage medium;
   wherein the hardware is programmed to synthesize network traffic by:
   extracting, from real traffic, a first real traffic composition parameter sequence and a second real traffic composition parameter sequence;
   generating a first synthetic traffic composition parameter sequence according to the first real traffic composition parameter sequence;
   obtaining relational coefficients between first traffic composition parameters and second traffic composition parameters by performing autocorrelation learning on the first real traffic composition parameter sequence and the second real traffic composition parameter sequence;
   generating a second synthetic traffic composition parameter sequence according to the first synthetic traffic composition parameter sequence and the relational coefficients; and
   generating synthetic traffic according to the first synthetic traffic composition parameter sequence and the second synthetic traffic composition parameter sequence.

13. The device according to claim 12, wherein the hardware is further programmed to:
   determine a structure of an automatic learning network model according to the first real traffic composition parameter sequence and the second real traffic composition parameter sequence;

establish a relational model between the first traffic composition parameters and the second traffic composition parameters according to the automatic learning network model; and generate the relational coefficients between the first traffic composition parameters and the second traffic composition parameters according to the relational model, the first real traffic composition parameter sequence, and the second real traffic composition parameter sequence.

14. The device according to claim 13, wherein the hardware is further programmed to:

analyze a multi-fractal wavelet model parameter according to the first real traffic composition sequence; and generate the first synthetic traffic composition parameter sequence by using a multi-fractal wavelet model according to the multi-fractal wavelet model parameter.

15. The device according to claim 13, wherein the first traffic composition parameter is a packet quantity in unit time and the second traffic composition parameter is a traffic volume in unit time.

16. The device according to claim 13, wherein the first traffic composition parameter is a traffic volume in unit time and the second traffic composition parameter is a packet quantity in unit time.

17. The device according to claim 13, wherein the first traffic composition parameter is a packet interval and the second traffic composition parameter is a packet size.

18. The device according to claim 13, wherein first traffic composition parameter is a packet size and the second traffic composition parameter is a packet interval.

19. The device according to claim 13, wherein the automatic learning network model comprises an artificial neural network model, a fuzzy artificial neural network model, or a regression model.

20. A non-transitory computer-readable storage medium with an executable program stored thereon, wherein the program instructs a relevant hardware to perform the following steps:

extracting, from real traffic, a first real traffic composition parameter sequence and a second real traffic composition parameter sequence;

generating a first synthetic traffic composition parameter sequence according to the first real traffic composition parameter sequence;

obtaining relational coefficients between first traffic composition parameters and second traffic composition parameters by performing autocorrelation learning on the first real traffic composition parameter sequence and the second real traffic composition parameter sequence;

generating a second synthetic traffic composition parameter sequence according to the first synthetic traffic composition parameter sequence and the relational coefficients; and generating synthetic traffic according to the first synthetic traffic composition parameter sequence and the second synthetic traffic composition parameter sequence.

* * * * *